United States Patent [19]  [11] 4,123,323
Weber et al.  [45] Oct. 31, 1978

[54] NUCLEAR REACTOR PLANT

[75] Inventors: Robert Weber, Uttenreuth; Erich Katscher, Marloffstein; Hans-Peter Schabert, Erlangen, all of Germany

[73] Assignee: Kraftwerk Union Aktiengesellschaft, Mulheim (Ruhr), Germany

[21] Appl. No.: 698,510

[22] Filed: Jun. 22, 1976

[30] Foreign Application Priority Data

Jun. 27, 1975 [DE] Fed. Rep. of Germany ....... 2528825

[51] Int. Cl.² ............................................. G21C 19/00
[52] U.S. Cl. ......................................... 176/30; 176/38; 214/18 N
[58] Field of Search ............................... 176/30, 31–32; 214/18 N, 152

[56] References Cited

U.S. PATENT DOCUMENTS 3,765,549 10/1973 Jones .................................. 214/18 N
3,883,012 5/1975 Jones .................................. 214/17 B
3,943,037 3/1976 Siegert et al. ........................... 176/30
3,980,188 9/1976 Weems ................................. 214/152

FOREIGN PATENT DOCUMENTS 1,514,702 10/1969 Fed. Rep. of Germany ............. 176/30
2,246,637 3/1974 Fed. Rep. of Germany ............. 176/30
2,253,232 3/1974 Fed. Rep. of Germany ............. 176/30

Primary Examiner—Samuel W. Engle
Assistant Examiner—Ralph Palo
Attorney, Agent, or Firm—Herbert L. Lerner

[57] ABSTRACT

A nuclear reactor plant has a fuel-element storage pit formed in a pit building and a pit adjacent thereto for safely lowering a fuel-element transporting cask therein, the adjacent pit being connected by a spur channel to the storage bit, a barrier separating the storage pit and the pit adjacent thereto, the barrier being at least one-half as high as the vertical length of the fuel-element transporting cask and being connected to the pit building in a manner as to be capable of withstanding at an upper edge thereof a lateral force equal to at least 10% of the maximum weight of the transporting cask.

6 Claims, 5 Drawing Figures

NUCLEAR REACTOR PLANT

The invention relates to a nuclear reactor plant. In German Published Nonprosecuted Application (DT-OS) N0. 22 53 232, there is disclosed a nuclear reactor plant having a fuel-element storage pit formed by a pit building and cask pit adjacent thereto for safely lowering a fuel-element transport cask therein, the adjacent cask pit being connected to the storage pit by a spur channel, and a railing for preventing a toppling transport cask from falling into the storage pit. The purpose of the heretofore known cask pit is to brake the fuel-element transport cask hydraulically so as to exclude the possibility of damage to the fuel-element transport cask if it should fall, or the possibility of causing further damage if it should crash into the fuel-element storage pit per se.

In the invention, of the instant application, as well, damage to the fuel-element transport cask as well as other damage that a toppling fuel-element transport cask might cause, are to be prevented.

It is an object of the invention to improve, under the hereinaforementioned circumstances, the spatial relationship within a nuclear reactor plant. This is especially important in the case wherein the fuel-element storage pit is located within the containment shell usually found in nuclear reactor plants, within which only limited space is available. The fuel-element transport cask was generally lowered heretofore directly into the fuel-element storage pit and, for this purpose, a given region of the latter was reserved therefor. But more recently, this conventional construction has been found to be the subject of criticism for the reason that the reprocessing of previously spent nuclear reactor fuel does not occur as expeditiously as had been expected. Nuclear power plants must therefore store spent fuel elements for extended periods of time in fuel-element storage pits, which had never been contemplated for such long-term storage.

With the foregoing and other objects in view, there is provided, in accordance with the invention, in a nuclear reactor plant having a fuel-element storage pit formed in a pit building and a pit adjacent thereto for safely lowering a fuel-element transporting cask therein, the adjacent pit being connected by a spur channel to the storage pit, a barrier separating the storage pit and the pit adjacent thereto, the barrier being at least one-half as high as the vertical length of the fuel-element transporting cask and being connected to the pit building in a manner as to be capable of withstanding at an upper edge thereof a lateral force equal to at least 10% of the maximum weight of the transporting cask. Space can consequently be saved in the containment shell, since the cask pit, which requires relatively little room, can be located practically directly adjacent the fuel-element storage pit. In the fuel-element storage pit per se, the space heretofore required for the transport cask which, for reasons of safety, was considerably larger than the cask pit, is saved. The barrier, which is more stable mechanically than a railing, employed in the prior art, and which is immovably connected to the pit building, ensures the receipt and removal of the fuel-element transport cask without disturbance in the spatially tightly adjacent fuel-element storage pit.

The immobility of the barrier is intended to apply to the case when the reactor is operational i.e. when the transport cask is being received or removed, so as to eliminate accidents caused by falling of a toppling transport cask into the fuel-element storage pit. At other times, for example when large-scale assembly or disassembly work is being performed, such as when steam generators must be transported for repair, the barrier can also be disassembled or removed, as no fuel-element transport is taking place at that time.

In accordance with another feature of the invention, the barrier is formed at least partly of concrete anchored to the pit building.

In accordance with a further feature of the invention, the barrier is formed with a gap through which fuel elements are transportable, the gap being narrower than the transporting cask. The fuel-elements need then only to be lifted far enough so that they come out of the transport cask, and not above or over the barrier per se. The gap can then be dimensioned for the width of a fuel element.

In accordance with an added feature of the invention, the nuclear reactor plant includes a fuel-element loading machine associated with the fuel-element storage pit, and track means extending past the fuel-element storage pit for guidingly carrying the fuel-element loading machine, the gap being formed with a constriction in vicinity of the track means. Thus the gap is constricted or narrowed-down in an upper region thereof, because only the gripping tool which is provided for the transport of the fuel elements and which may be narrower than the fuel elements themselves, need pass therethrough. This is true especially for the region of the track means guidingly carrying the fuel-element loading machine associated with the fuel-element storage pit, which should be capable of being traveled on in spite of the gap.

In accordance with an additional feature of the invention, guide means are provided at the gap for guiding fuel elements therein. The guide means become gently or gradually narrower in direction toward the gap, so that severe impacts during transport of the fuel elements are avoided.

In accordance with yet another feature of the invention, the nuclear reactor plant includes a circling crane and means providing a path of travel of the circling crane over the pit building, the gap extending along the travel path of the circling crane.

Since the barrier according to the invention is connected to a great extent firmly to the pit building, it has adequate strength or rigidity to withstand the effects of a transport cask weighing 100 tons, for example, that is driven accidentally against the barrier. For this purpose, as generally aforementioned, the barrier is constructed, for example, in the form of a concrete wall which is structurally combined with the pit building and is anchored by steel inserts thereto.

In accordance with an alternative embodiment of the invention, the nuclear reactor plant includes a fuel-element loading machine associated with the fuel-element storage pit, the loading machine being displaceable along a given travel path, the barrier being movable within the range of the travel path. In this alternate embodiment, the barrier is formed as a gate, preferably of steel beams, which is moved to one side either by a swinging motion or by motion in longitudinal direction thereof to permit the loading machine to travel.

In accordance with yet a further feature of the invention, the nuclear reactor plant includes a fuel-element loading machine associated with the fuel-element storage pit, the loading machine being displaceable along a given travel path, the barrier being disposed, however, outside the range of the travel path. In that case, the barrier may be connected entirely to the pit building. It can then, for example, be formed, in its entirety, as a steel-reinforced concrete structure. However, it is also conceivable to select a steel construction securely anchored to the pit building which can be non-destructively dismantled in special situations, for example, for transporting large components such as steam generators. The transportation of the fuel elements between the cask pit and the fuel-element storage pit can be effected in such a case by providing the loading machine with a retractable arm which overlaps the cask pit. During normal operation of the loading machine, this arm is not used and accordingly, does not interfere in any manner with the progress of the fuel element exchange, during which the loading machine moves between the fuel-element storage pit and the reactor pressure vessel i.e. outside the cask pit.

In accordance with a concomitant and alternative feature of the invention, the nuclear reactor plant includes a loading crane carried by the barrier for loading transporting casks into the storage pit through the adjacent cask pit. Other features which are considered as characteristic for the invention are set forth in the appended claims.

Although the invention is illustrated and described herein as embodied in a nuclear reactor plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
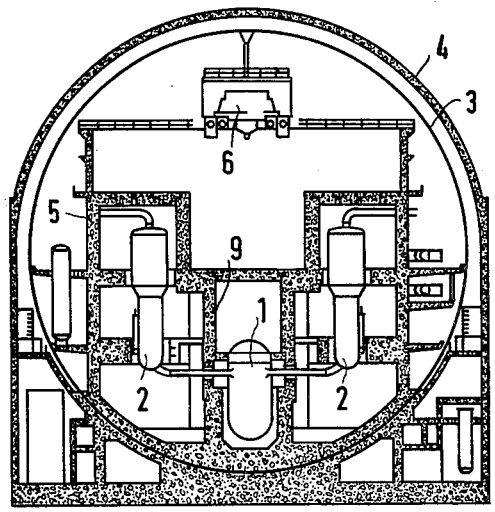
FIGS. 1 and 2 are vertical cross-sectional views, in respective planes that are substantially mutually perpendicular, of the main part of a nuclear reactor plant with a pressurized water reactor.
Figure 2:
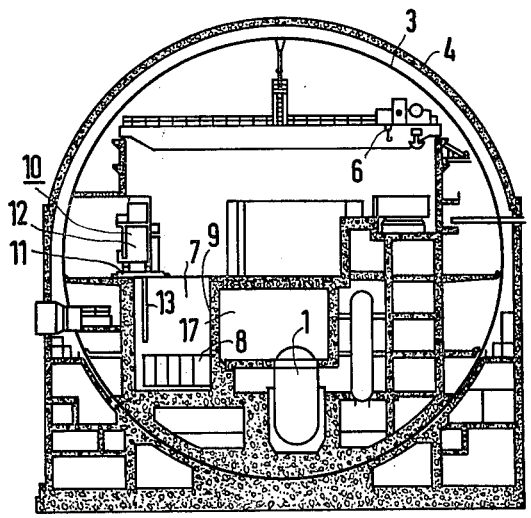

Referring now to the drawing and first, particularly, to FIGS. 1 and 2 thereof, there is shown a nuclear reactor plant with a reactor pressure vessel 1 and steam generators 2 disposed in a containment structure 3 in the form of a steel sphere, which is surrounded by a concrete building 4 providing a secondary shielding. In the interior of the containment structure 3, a concrete cylinder 5 provides protection for the containment structure 3 against fragments which might fly about in the event of a rupture of individual components. A crane 6 having a circular travel path is mounted on the concrete cylinder 5.

Next to the reactor pressure vessel 1, a fuel-element storage pit or tank 7, which contains racks 8 for receiving the fuel elements, is provided in the interior of the containment structure 3. The fuel-element storage pit 7 is formed by a pit building 9 constructed of concrete, which is structurally united with the concrete cylinder 5 and the remaining building parts within the containment structure 3.

Fuel element exchange during which new fuel elements from the rack 8 are inserted into the reactor pressure vessel 1, and spent fuel elements are transported away from the reactor pressure vessel 1, is accomplished by means of a fuel-element loading machine 10. The latter is formed primarily of a runner or platform 11, running on tracks and carrying a conventional positioning device 12, with which a conventional manipulator or gripper 13 is associated.

Figure 3:
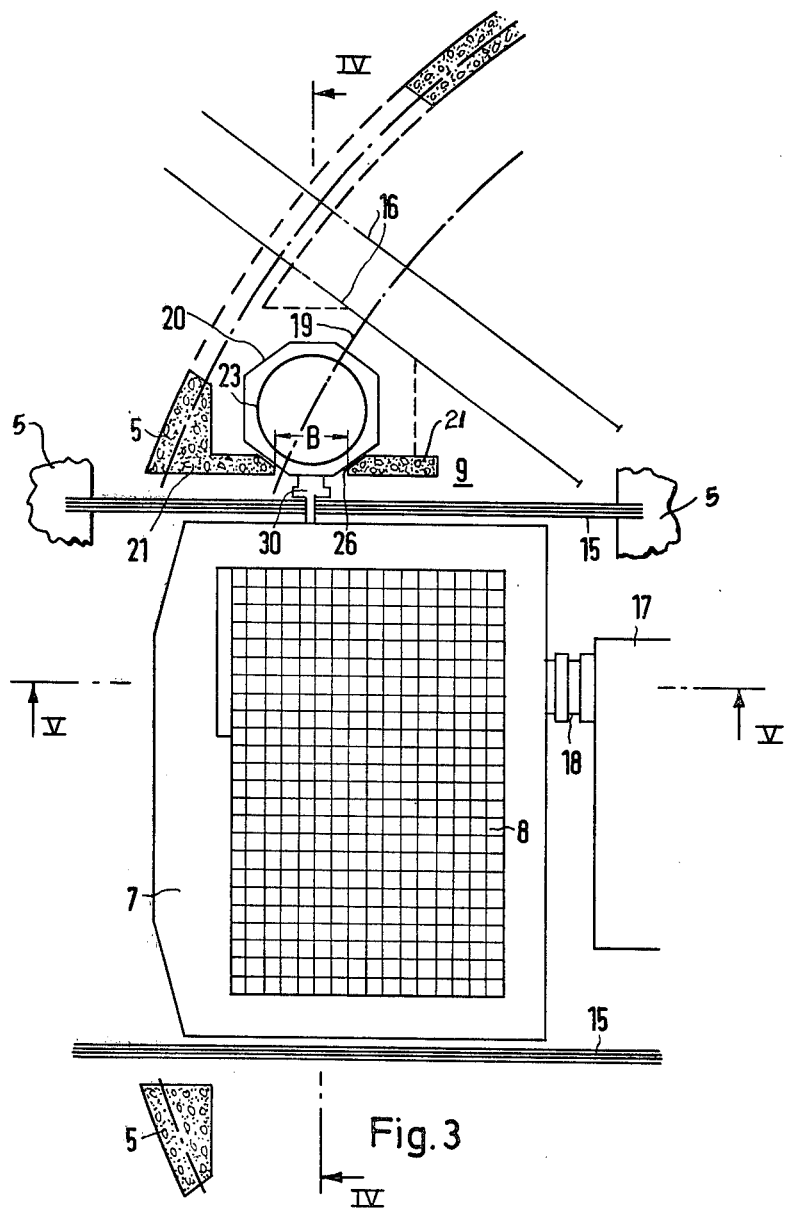
FIG. 3 is a fragmentary enlarged top plan view, partly in section, of FIG. 1.

In FIG. 3, the tracks 15 for the loading machine 10 are shown. They extend along the fuel-element storage pit 7 and lead from the fuel-element storage pit 7 to a pit section 17 which is connected to the reactor pressure vessel 1 (FIG. 2). A closable conduit or channel 18 is provided between the fuel-element storage pit 7 and the pit section 17. Additional tracks 16 of standard gauge extend from the containment structure 3 to the outside in radial direction through a nonillustrated lock system.

A regular or symmetrical octagonal receptacle pit 20 is disposed near the fuel-element storage pit 7 and is separated therefrom by a barrier 21. In the illustrated embodiment, the barrier 21 is of steel-reinforced concrete construction, and is structurally united or integral with the concrete of the pit building 9 and the cylinder 5 which provides a shielding against flying debris and fragments. The reinforcement steel of the barrier 21 can be anchored to the reinforcement steel of the debris-shielding cylinder 5 and the pit building 9. In any event, the strength of the barrier 21, with a permissible lateral force of 50 tons applied at the upper edge thereof, exceeds by far the conventionally accepted load strength of 10%, for example, for cranes, and in the case at hand, corresponding to 10% of the transport receptacle weight of 100 tons.

The receptacle pit 20 is located within the effective working area or range of the circling crane 6, as indicated by the dash-dot line 19, the tracks of the crane 6 being mounted on the flying debris-shielding cylinder 5, as shown in FIGS. 1 and 2. A transport connection thereof with the tracks 16 is thereby formed, the travel direction of which is a circular path parallel to i.e. uniformly spaced from, the flying debris-shielding cylinder 5.

Figure 5:
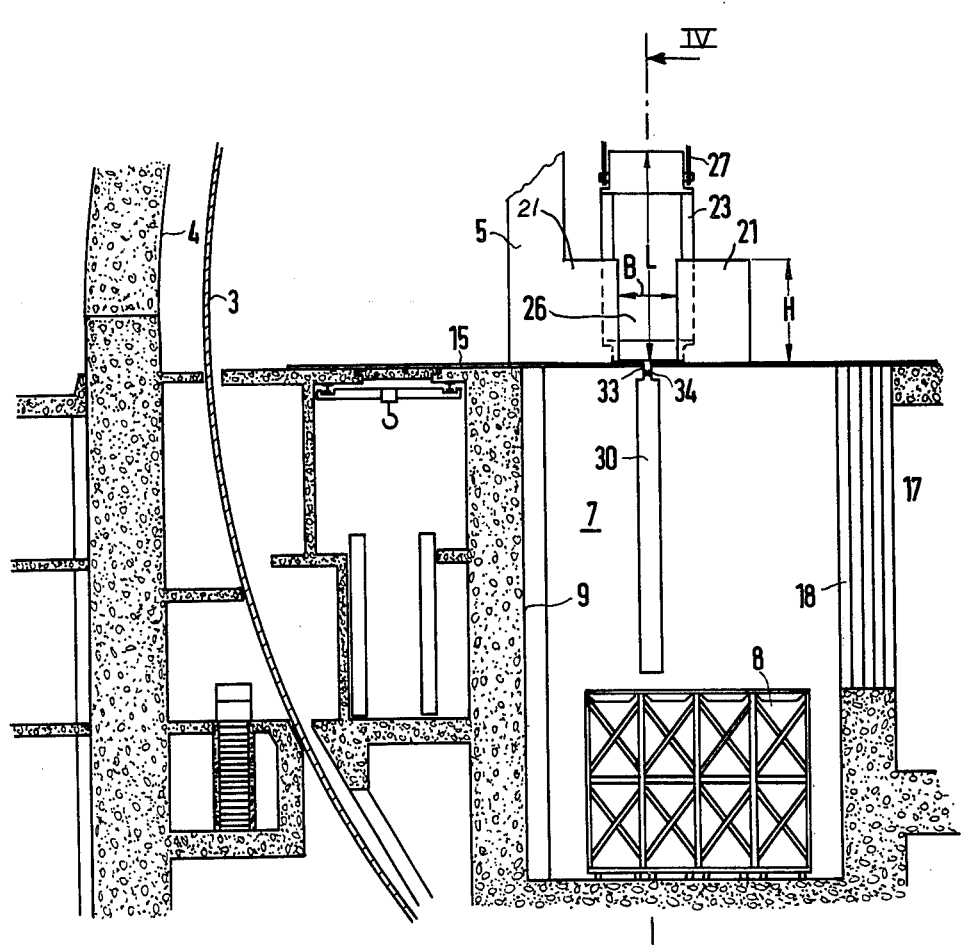

As shown in FIG. 5, the height H of the barrier 21 is greater than half the length L of a cylindrical fuel-element transport receptacle or cask 23. A gap 26 is formed in the barrier 21, which, in the illustrated embodiment, is disposed in its entirety adjacent the travel range or path, represented by the track 15 of the loading machine 10. The width B of the gap 26 is smaller than the diameter of the transport receptacle or case 23. Therefore, the transport receptacle 23 is reliably retained if it should inadvertently be moved too far in direction toward the storage pit 7. Through suitable dimensioning of suspension gear 27 formed of non-rusting material and engaging the cask 23, care can be taken that the cask 23 cannot be lifted excessively high e.g. not more than 1 meter above the height of the tracks 16.

The gap 26 has a downwardly projecting extension in the form of a spur channel 30, as viewed in FIG. 5, and connects the cask pit 20 with the fuel storage pit 7. The spur channel 30 permits fuel elements 31 to be passed therethrough, as may be seen in FIG. 4. For this purpose, the spur channel 30 is matched or accommodated to the dimensions of the fuel elements 31. The upper part 33 of the spur channel 30 is constricted. Guide rails 34 are provided thereat to facilitate the entry of the fuel elements 31 into the gap 26, 30 when they are transported between the cask pit 20 and the fuel-element storage pit 7 by a retractable arm 28 of the loading machine (FIG. 4).

Since the retractable arm 28 of the loading machine 10 has a direction of motion transverse to the tracks 15, the longitudinal direction of the gap 26 and of the spur channel 30 is at right angles to the tracks 15. However, the gap 26 and the spur channel 30 can also be disposed in the direction of motion or travel of the crane 6 along its circular path, when the transport of the fuel elements between the cask pit 20 and the fuel-element storage pit 7 is effected with the crane 6, employing, if necessary, a small lifting device of specialized conventional construction. A further possibility is that the barrier 21 supports a separate loading crane, since the strength thereof is fully adequate for such purposes.

Figure 4:
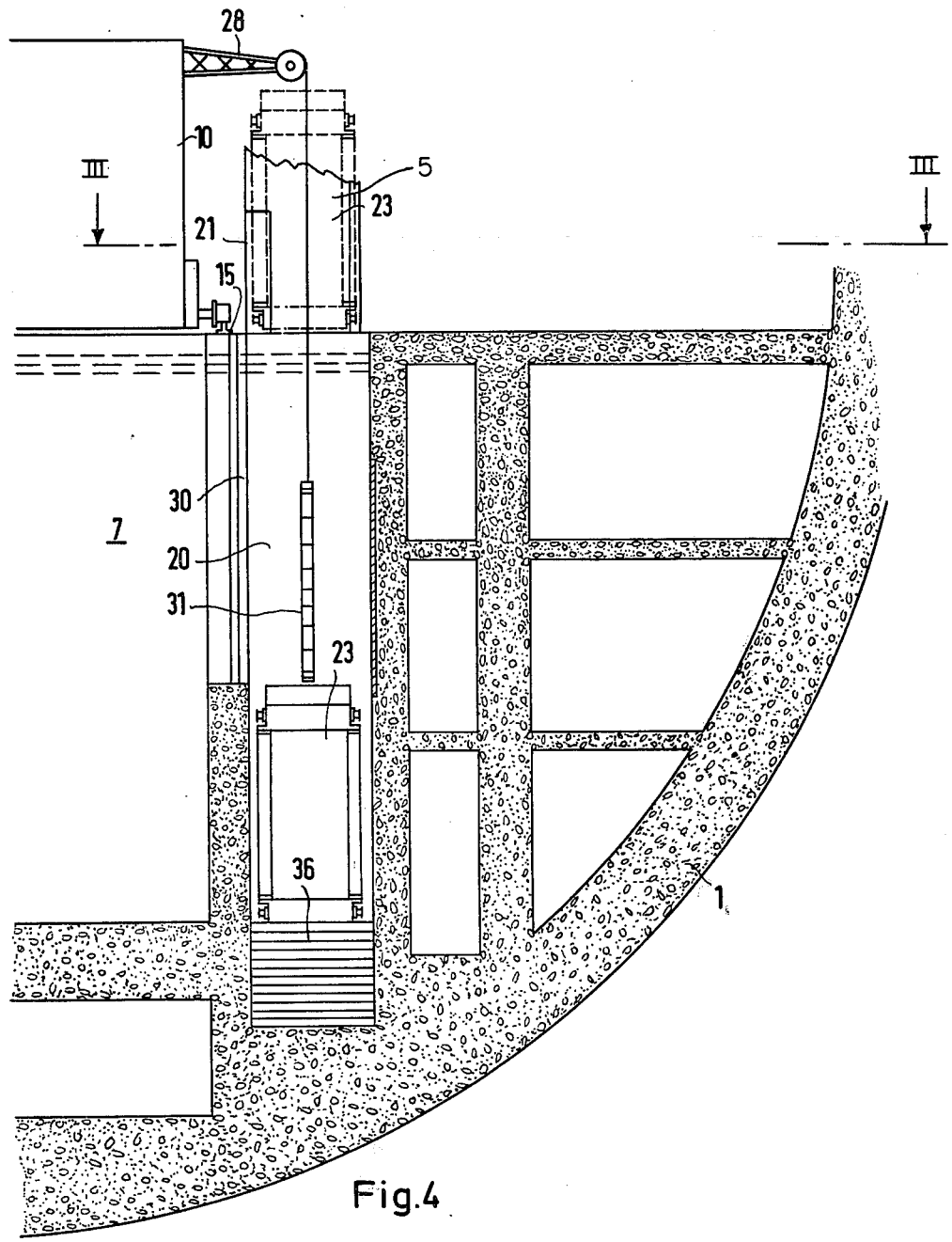
FIGS. 4 and 5 are additional fragmentary enlarged vertical sectional views of the plant perpendicular to one another and to FIG. 3.

FIG. 4 further shows that the transport receptacle or cask 23 is closely surrounded by the receptacle pit 20. A hydraulic damping effect is produced thereby in case the receptacle or cask 23 should come crashing down. In addition, a damping device 36, such as a shock absorber with deformable sheet-metal plates is disposed at the bottom of the receptacle pit 20 and limits the shock introduced into the building maximally to $2 \times 10^6$ kg or 2000 Mp (megapond). Furthermore, the tight enclosure secures the transport receptacle or cask 23 also against earthquake shocks. If necessary, this bracing can also be improved by runners which are attached at the receptacle pit 20 in accordance with the dimensions of the transport vessel or cask 23.

There are claimed:

1. In a nuclear power plant having a pit building constructed of concrete and forming walls defining a fuel-element storage pit and a cask pit adjacent thereto for safely lowering a fuel-element transporting cask therein, the cask pit being connected by a spur channel to the fuel-element storage pit, a barrier disposed in vicinity of the spur channel and extending transversely thereto, the fuel-element storage pit having means defining a transport plane disposed at an upper edge thereof, said barrier extending upwardly from said transport plane and having a height equal to at least one-half the vertical length of the fuel-element transporting cask, said barrier being formed with a gap located above said spur channel through which fuel-elements are transportable between the fuel-element storage pit and the cask pit, said gap being narrower than the transporting cask.

2. Nuclear reactor plant according to claim 1 wherein said barrier is formed at least partly of concrete anchored to the pit building.

3. Nuclear reactor plant according to claim 1 including tracks for a loading machine disposed on said transport plane.

4. Nuclear reactor plant according to claim 3, wherein the spur channel below said barrier is formed with a constriction in vicinity of said tracks.

5. Nuclear reactor plant according to claim 4 including means located in said constriction of said spur channel for guiding fuel elements therein.

6. Nuclear reactor plant according to claim 1 including a loading crane carried by said barrier for loading transporting casks into said storage pit through said adjacent cask pit.

* * * * *